United States Patent
Sansonetti et al.

(10) Patent No.: US 6,456,770 B1
(45) Date of Patent: Sep. 24, 2002

(54) METHOD, A SYSTEM, AND A LINE FOR OPTICAL FIBER TRANSMISSION

(75) Inventors: Pierre Sansonetti, Palaiseau; Louis-Anne de Montmorillon, Paris, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/497,510

(22) Filed: Feb. 4, 2000

(30) Foreign Application Priority Data

Feb. 18, 1999 (FR) .............................................. 99 02030

(51) Int. Cl.$^7$ .............................. G02B 6/02; H04J 14/02
(52) U.S. Cl. ...................... 385/123; 385/124; 359/124; 359/161
(58) Field of Search ................................ 385/123–126; 359/161, 124

(56) References Cited

U.S. PATENT DOCUMENTS

| | | | | |
|---|---|---|---|---|
| 5,191,631 A | * | 3/1993 | Rosenberg ................... | 385/123 |
| 5,778,128 A | * | 7/1998 | Wildeman ................... | 385/123 |
| 6,157,754 A | * | 12/2000 | Sansaoka et al. ............. | 385/24 |
| 2001/0000442 A1 | * | 4/2001 | Okuno et al. ................ | 359/124 |

FOREIGN PATENT DOCUMENTS

| | | |
|---|---|---|
| EP | 0 779 524 A2 | 6/1997 |
| EP | 0 789 255 A1 | 8/1997 |
| EP | 0 790 510 A2 | 8/1997 |
| EP | 0 880 243 A2 | 11/1998 |
| FR | 2 768 233 A1 | 3/1999 |
| JP | 09 211 511 | 8/1997 |
| WO | WP 98/49586 | 11/1998 |

OTHER PUBLICATIONS

Able, K. M.: "Evolving Optical Fiber Designs" CCECE '97. Canadian Conference on Electrical and Computer Engineering. Engineering Innovation: Voyage of Discovery. Conference Proceedings (Cat, No. 97TTH8244), CCECE '97, Canadian Conference on Electrical and Computer Engineering. Engineering Innovat, pp. 888–891, vol. 2, XP002123554, 1997, New York, NY, USA, IEEE USA ISBN: 0–7803–3716–6.

Ivan, P. Kaminow & Thomas L. Kock Editors: "Optical Fiber Telecommunications III A" 1997, Academic Press, USA XP002123555 Chapter 8 by F. Forghirei et al.: "Fiber Nonlinearities and Their Impact on Transmission Systems".

* cited by examiner

*Primary Examiner*—Hemang Sanghavi
(74) *Attorney, Agent, or Firm*—Sughrue Mion, PLLC

(57) ABSTRACT

The line optical fiber of the system is single-mode and has a very large effective mode area accompanied by high chromatic dispersion and/or a steep spectrum gradient of said dispersion. Compensation means are associated with said fiber so as to compensate at least a major portion of said dispersion and/or of said gradient. They are integrated into repeater units distributed along the transmission line. The invention applies to telecommunications.

6 Claims, 1 Drawing Sheet

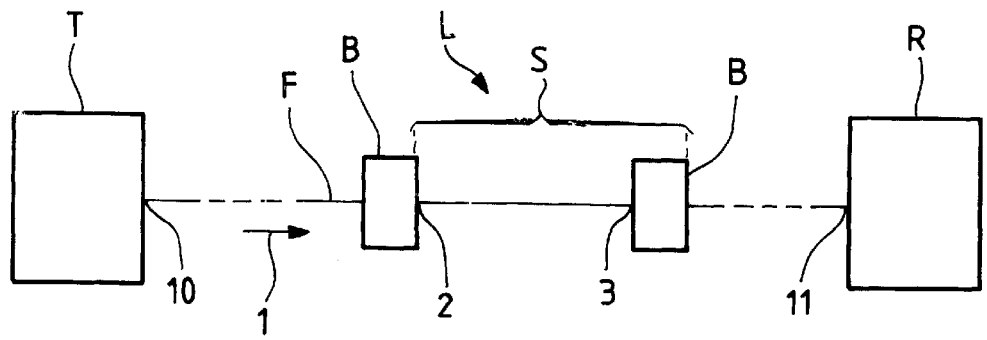
FIG_1
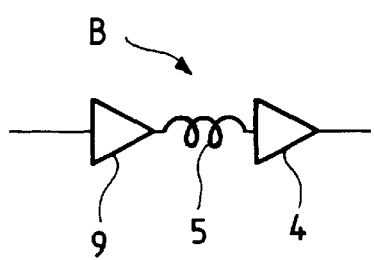
FIG_2
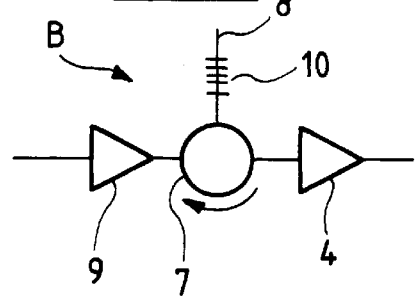
FIG_3
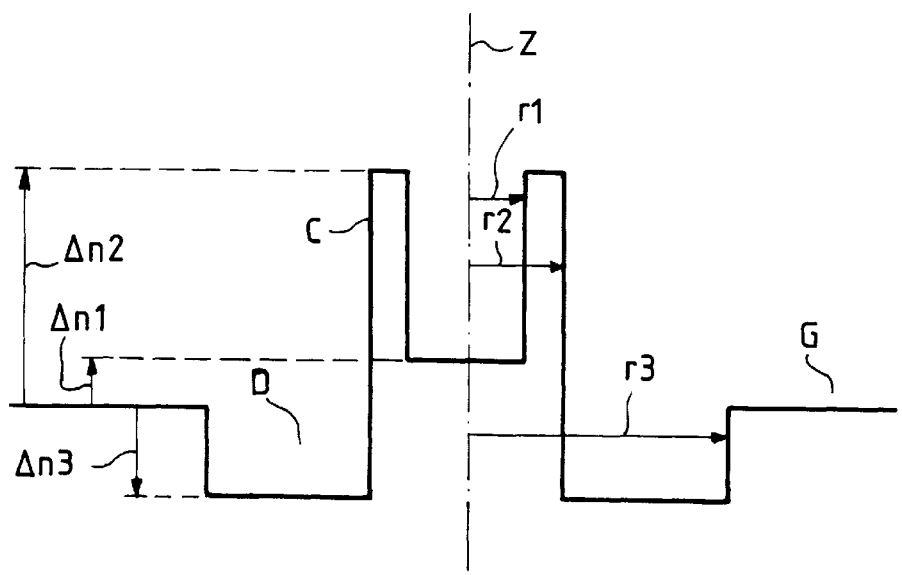
FIG_4

METHOD, A SYSTEM, AND A LINE FOR OPTICAL FIBER TRANSMISSION

The present invention relates to transmission systems in which "line" optical fibers guide optical signals that carry information to be transmitted. The present invention relates more particularly to the case when such fibers are of the single-mode type at the wavelengths used.

BACKGROUND OF THE INVENTION

Regardless of its type, a line fiber has losses. In long-distance transmission, such losses are compensated by amplifiers or repeaters distributed along the length of a transmission line made up of a succession of such fibers. Such a line is then in the form of a succession of segments, each of which is terminated by an amplifier, and the segments are connected together in series. In order to lower the cost of the system, it is desirable to increase the length of each of the segments to as long as possible. Unfortunately, each amplifier has characteristic noise that increases with increasing gain, and, given the in-line losses, this limits said length.

The line fiber also has chromatic dispersion and a the dispersion has a spectrum gradient. The dispersion depends on the carrier wavelength, i.e. on the wavelength that carries the transmitted signal. The dispersion can deform the signal. In addition, the capacity of the system, i.e. the data rate at which information can be transmitted, is typically increased by multiplexing in which a plurality of carrier wavelengths are used to carry the information. In which case, the gradient of the dispersion prevents the same dispersion value being obtained for each of the wavelengths. Chromatic dispersion values that are too high can give rise to excessive deformation of the signals. That is why, in known manner, the deformation is periodically corrected by dispersion compensators whose dispersion and optionally whose dispersion gradient are opposite in sign to those of the line fiber. Unfortunately, in long-distance transmission, the compensators impart losses, and the higher the dispersion per unit length to be compensated, the higher the losses imparted by such compensators. That is why it is generally desirable to limit the dispersion per unit length of the line fibers.

In early optical fiber transmission systems, the line fibers initially laid were chosen to have low dispersion at the carrier wavelength which was then preferred, namely 1,300 nm. However, it later transpired that a range of wavelengths around 1,550 nm was preferable because that made it possible to use amplifiers having erbium-doped fibers. It then became apparent that the high dispersion values that the initially-laid fibers had at those new wavelengths were incompatible with the desired high data rates. One solution that was then considered was to insert a dispersion compensator at the outlet of each of the line segments of the system. It was implemented because it cost less than laying a new fiber suitable for the new range of wavelengths.

Furthermore, in order to increase the transmission quality of known systems by increasing their signal-to-noise ratio, specialists sought to increase the outlet power level of the amplifiers in those systems. Unfortunately, they were limited by non-linear effects developing and degrading transmission quality. Such effects are significant because the values of the optical electric field that accompanies the propagation of the guided waves are too high. For a given power level of the guided waves, the greater the effective mode area offered to the signals by the line fiber used, the lower the value of that field.

That area depends on the carrier wavelength of the signals and it is defined by the following formula:

$$S_{eff}=2\pi(\int \psi^2(r) \cdot r \, dr)^2 / \int \psi^4(r) \cdot r \, dr$$

in which the two integrals are defined from zero to infinity, r is the distance to the axis of the fiber, and $\psi$ is the amplitude of the optical electric field. Said effective area may considered as being the area over which the power of the optical signals is distributed in each right cross-section of said fiber.

In order to increase the signal-to-noise ratio, specialists want that area to be as large as possible. However, they know that if they are to increase that area to as large as possible, they will also have to increase the chromatic dispersion of the fiber. It is well known that such dispersion is the sum of two components whose signs are generally opposite, namely a "material dispersion" and a "waveguide dispersion". Since the material component is imposed by the material and tends to be preponderant, the sum of the two components can be reduced only by increasing the absolute value of the waveguide component. Unfortunately, the waveguide component is proportional to the index difference between the core and the cladding of the fiber. In order to reduce the dispersion of the fiber, it is thus necessary to increase the index difference, which tends to reduce the effective mode area.

That is why, when a new optical fiber transmission system is to be installed over a long distance, it is currently considered that the values of the chromatic dispersion of the line fiber used should be limited, which inevitably limits the effective mode area of the line. That area typically lies in the range 70 $\mu m^2$ to 120 $\mu m^2$ for fibers whose dispersion is a few ps/(nm·km).

OBJECTS AND SUMMARY OF THE INVENTION

An object of the present invention is to make it possible, for limited cost, to provide a long-distance transmission system that uses single-mode fibers and that offers good transmission quality, while also enabling information to be carried at a high data rate.

To this end, the present invention provides, in particular, such a system which uses a single-mode fiber having a very large effective mode area accompanied by high chromatic dispersion and/or a steep spectrum gradient of said dispersion, compensation means being associated with said fiber and compensating at least a major portion of said dispersion and/or of said gradient.

In the context of the invention, it has been found that, in order to make a novel transmission system, dispersion compensators of known type make it possible to compensate appropriately the chromatic dispersion of a line fiber that has an effective mode area that is considerably larger than those of known fibers used in such a system. It has also been found that the losses imparted by the compensators are more than compensated by an increase in the power level of the signals that can then be guided by said fiber without increasing to an excessive extent the non-linear effects affecting the signals in the fiber at the outlets of the amplifiers. The invention thus makes it possible to increase the signal-to-noise ratio appearing at the line outlet, and thus the performance of the system. In addition, the margin that it provides for the chromatic dispersion of the line fiber makes it possible to limit the cost of said fiber.

BRIEF DESCRIPTION OF THE DRAWING

With reference to the accompanying drawing, an indication is given below of various aspects of the invention, and a description is given below by way of example of how it may be implemented.

When two elements performing the same function are shown in the figures, said elements are given like reference numerals or letters.

In the drawing:

FIG. 1 shows a transmission system of the invention;

FIGS. 2 and 3 respectively show a first embodiment and a second embodiment of a repeater unit of the system shown in FIG. 1; and FIG. 4 shows the parameters of the index profiles of two line fibers that can be used in the system shown in FIG. 1.

MORE DETAILED DESCRIPTION

As shown in FIG. 1, and as is usual, the system of the invention includes a transmitter T connected to a receiver R via a transmission line L. The transmitter T transmits optical signals carrying information to be transmitted. The line L guides the signals in the direction indicated by an arrow 1. The receiver R receives said signals and retrieves the transmitted information.

The line L also lies within the present invention. It has an inlet 10 and an outlet 11. It is made up of a succession of segments, such as segment S, connected together in series. Each of the segments extends from an inlet 2 to an outlet 3 of the segment, and is made up of a succession of elements connected together in series. In known manner, these elements are, in particular, as follows, starting from said inlet:

A single-mode optical fiber F made of silica and extending substantially to the outlet of said segment so as to guide at least one carrier wave. This fiber has an effective mode area for said wave. It also has chromatic dispersion and said dispersion has a gradient. It constitutes a line fiber.

And a dispersion compensator disposed at the outlet of the segment and compensating at least a major portion of the chromatic dispersion of the fiber F and/or the gradient of said dispersion. The dispersion compensator is integrated in the repeater unit B. It is shown at 5 in FIG. 2 and at 7 & 8 in FIG. 3.

In the context of the present invention, the effective mode area of the line fiber is greater than 100 $\mu m^2$ and preferably greater than 150 $\mu m^2$ for a carrier wave having a wavelength of 1,550 nm. When the chromatic dispersion of the fiber is greater than 6 ps/(nm·km) for a carrier wave guided by said fiber and having a wavelength lying in the range 1,530 nm to 1,570 nm, the dispersion compensator preferably compensates at least 90% of said dispersion. When the system uses wavelength division multiplexing and when the dispersion gradient of said fiber is greater than 0.05 ps/(nm²·km) in the vicinity of the wavelength 1,550 nm, the dispersion compensator preferably compensates at least 90% of said gradient.

The length of each of the segments of the line fiber may typically be as long as 300 km.

Typically, and as shown in FIGS. 2 and 3, the succession of elements of each line segment further includes an optical amplifier associated with the dispersion compensator for the purpose of compensating the losses of the line fiber of said segment. Said amplifier is shown at 4 and 9 in FIGS. 2 and 3.

As shown in FIG. 2, the dispersion compensator of each segment may, in particular, be constituted by a dispersion-compensating fiber 5. The amplifier of this segment then preferably includes an outlet stage 4 disposed after said compensator so as to prevent non-linear effects from appearing in the compensating fiber. In addition, the amplifier advantageously further includes a first stage 9 disposed between the line fiber and said compensator.

As shown in FIG. 3, the dispersion compensator may be constituted by an optical circulator 7 and by a Bragg grating 10 whose pitch varies progressively. The grating is photo-inscribed in an optical fiber 8.

The dispersion compensator and the amplifier are typically integrated in a repeater unit B.

In FIG. 4 which shows the parameters of index profiles, radii are plotted horizontally starting from the axis Z of a line fiber that can be used in the context of the invention. Index differences are plotted vertically. These are differences in the refractive indices of the inner materials of said fiber relative to the refractive index of the material constituting the optical cladding G of said fiber. Such a fiber includes a composite core C constituted by a central portion having a radius $r_1$ and a positive index difference $\Delta n_1$ and by a peripheral portion having a radius $r_2$ and a positive index difference $\Delta n_2$ greater than the index difference of the central portion. The core is surrounded by a confinement ring D having a radius $r_3$ and a negative index difference $\Delta n_3$.

In a first such fiber $r_1=2.05$ $\mu m$, $r_2=5.13$ $\mu m$, $r_3=9$ $\mu m$, $\Delta n_1=0$, $\Delta n_2=6.5\times10^{-3}$, and $\Delta n_3=-2\times10^{-3}$. The effective mode area is then $S_{eff}=103.4$ $\mu m^2$, the chromatic dispersion is CD=17 ps/(nm·km), the gradient of said dispersion is CDG =0.064 ps/(nm²·km), the effective index difference is $\Delta n_{eff}=2.42\times10^{-3}$, and the mode radius using Petermann's second definition is WO2 =4.98 $\mu m$, these values being given for a wavelength of 1,550 nm.

In a second such fiber, the corresponding parameters for the same wavelength are:

$r_1=3.78$ $\mu m$, $r_2=6.13$ $\mu m$, $r_3=16.60$ $\mu m$, $\Delta n_1=1.4\times10^{-3}$, $\Delta n_2=7\times10^{-3}$, $\Delta n_3=-2.8\times10^{-3}$, $S_{eff}=150.8$ $\mu m^2$, CD=17 ps/(nm·km), CDG=0.072 ps/(nm²·km), $\Delta n_{eff}=2.32\times10^{-3}$, and WO2=5.26 $\mu m$.

The invention further provides a transmission method in which a system as described above is made and then used. The method includes known steps that are similar to those of the known method in which the above-mentioned prior systems are made, used, modified, and reused.

These known steps include forming a transmission line such as the line L made up of segments such as S. The succession of elements of each of the segments includes the following, starting from the inlet of said segment:

a line fiber such as the Fiber F; and an amplifier such as the amplifier 4.

The method further includes the known steps of:

connecting a transmitter T to the inlet 10 of the transmission line, which transmitter is suitable for receiving information and for responding by delivering optical signals carrying said information;

connecting a receiver R to the outlet 11 of said line, which receiver is suitable for receiving optical signals and for responding by delivering information carried by said signals;

obtaining information to be transmitted;

delivering the information to be transmitted to the transmitter T so that the receiver R responds by delivering said information; and inserting a dispersion compensator such as 5, or 7 & 8, into each of the segments of the transmission line, which compensator is associated with the outlet amplifier 4 of said segment, and compensates at least a major portion of the chromatic dispersion of said fiber and/or the gradient of said dispersion.

In the above-mentioned known method, the step of inserting a dispersion compensator takes place subsequently to the other above-mentioned steps. Conversely, in the context of this invention, at least the step in which the information to be transmitted is delivered to the transmitter is performed only after the step of inserting a dispersion compensator such as 5 into each of the segments such as S.

What is claimed is:

1. An optical fiber transmission line made up of a succession of segments connected together in series, each of the segments extending from an inlet to an outlet of said segment, and including a succession of elements connected together in series, which succession of elements includes the following, starting from said inlet:

a single-mode optical fiber extending substantially to said outlet of said segment for guiding at least one carrier wave, the fiber having an effective mode area and chromatic dispersion for said wave, and also having a spectrum gradient of said dispersion, said fiber constituting a line fiber; and a dispersion compensator disposed at said outlet of said segment and compensating at least a major portion of said chromatic dispersion of the line fiber and/or of said gradient of said dispersion;

wherein said effective mode area of the line fiber is greater than 150 $\mu m^2$ for one of said carrier waves having a wavelength of 1,550 nm.

2. A line according to claim 1, said chromatic dispersion of the line fiber being greater than 6 ps/(nm·km) for one of said carrier waves having a wavelength lying in the range 1,530 nm to 1,600 nm, said dispersion compensator compensating at least 90% of said dispersion.

3. A line according to claim 1, said gradient of the chromatic dispersion of the line fiber being greater than 0.05 ps/(nm$^2$·km) in the vicinity of a wavelength of 1,550 nm, said dispersion compensator compensating at least 90% of said gradient.

4. A line according to claim 1, said line fiber of each of said segments having a length of less than 300 km.

5. A line according to claim 1, said succession of elements further including an optical amplifier associated with said dispersion compensator.

6. An optical fiber transmission method including a step of making a transmission line having an optical fiber suitable for guiding optical signals from an inlet to an outlet of said line, said line being made up of a succession of segments connected together in series, each of the segments extending from an inlet to an outlet of said segment, and being made up of a succession of elements connected together in series, said succession of elements including the following, starting from said inlet:

an optical fiber extending substantially to said outlet of said segment for the purpose of guiding a carrier wave, said fiber having chromatic dispersion and an effective mode area for said wave, and also having a gradient of said dispersion and losses, said fiber constituting a line fiber; and an optical amplifier disposed at said outlet of said segment and compensating at least a major portion of said losses of the line fiber;

the method further including the following steps:

connecting a transmitter to said inlet of the transmission line, said transmitter being suitable for receiving information and for responding by delivering optical signals carrying said information;

connecting a receiver to said outlet of the transmission line, said receiver being suitable for receiving optical signals and for responding by delivering information carried by said signals;

obtaining information to be transmitted;

delivering said information to be transmitted to said transmitter so that said receiver responds by delivering said information; and inserting a dispersion compensator into each of said segments of the transmission line, which compensator is associated with said optical amplifier of said segment, said compensator compensating at least a major portion of said chromatic dispersion of said fiber and/or of said gradient of said dispersion;

wherein at least said step of delivering information to be transmitted to said transmitter is performed only after said step of inserting a dispersion compensator into each of said segments, and wherein said transmission line is made according to claim 1.

* * * * *